Patented Feb. 12, 1935

1,991,084

UNITED STATES PATENT OFFICE 1,991,084

TREATMENT OF ORGANIC COMPOUNDS

Henry Dreyfus, London, England

No Drawing. Application May 5, 1931, Serial No. 535,286. In Great Britain May 13, 1930

10 Claims. (Cl. 202—42)

This invention relates to the production of concentrated acetic or other lower fatty acids from their dilute solutions.

The concentration of dilute acetic acid for the production of substantially anhydrous acetic acid is accomplished with considerable difficulty. Glacial acetic acid can for instance be produced from dilute acetic acid of, for example, 30% strength by direct distillation, but the operation is tedious and the consumption of heat high. The concentration is effected much more readily by distillation in the presence of substances which yield with water azeotropic mixtures, that is to say mixtures which boil at a constant temperature and behave in this respect like individual chemical substances. By selecting such a substance, hereinafter referred to as the entraining liquid or body, yielding with water a mixture boiling constantly at a temperature appreciably below the boiling point of acetic acid, water may readily be removed, leaving a residue of substantially anhydrous acid. It is desirable that the entraining liquid may readily be separated from the aqueous distillate for further use. Preferably therefore entraining liquids immiscible with water are employed, for example benzene, ethyl acetate, xylene and the like. These liquids are however also not miscible in all proportions with the dilute acid, for example with dilute acetic acid of 20–30% strength, and in consequence the contact between the dilute acid and the entraining liquid is not all that could be desired.

The present invention aims at bringing about a more intimate contact between the aqueous acid and the entraining liquid and increasing the efficiency of the concentration process, for example as regards the size of apparatus necessary for a given output of concentrated acid and as regards the quantity of entraining liquid which must be distilled.

In accordance with the present invention, in producing concentrated acetic or other lower aliphatic acid from aqueous solutions by distillation in the presence of an entraining liquid, the dilute acid and entraining liquid are brought into the form of a homogeneous mixture. Thus the dilute acid and entraining liquid may be mixed with concentrated acid. For example the dilute acid and entraining liquid may be introduced into heated concentrated acid in such proportions as to avoid separation of the mixture into layers. In this manner intimate contact between the aqueous acid and the entraining liquid is assured during the simultaneous or subsequent distillation of the water as an azeotropic mixture with entraining liquid.

Various methods of working may be adopted. For example, a mixture of the entraining liquid with substantially anhydrous acid may be heated in a still and the dilute acid to be concentrated introduced continuously together with entraining liquid in proportion at least sufficient to yield an azeotropic mixture with the water to be removed. The azeotropic mixture of water and entraining liquid is continuously distilled off, concentrated acid accumulating in the still. Portions of the still contents may be removed, either continuously or intermittently as desired, and if necessary treated by distillation or otherwise in order to separate the concentrated acid from the entraining liquid.

The still is preferably provided with a rectifying column and the supply of heat to the still so adjusted that the azeotropic mixture of water and the entraining liquid escapes in the form of a vapour from the top of the column. The vapours may be condensed and the condensate allowed to separate into layers, the layer consisting of or comprising the entraining liquid being returned to the still.

The mixture of concentrated acid and entraining liquid accumulating in the still may be continuously removed and treated in an auxiliary distillation column, which may be of comparatively small dimensions, for the purpose of separating the entraining liquid and any small quantities of water which may be present from the anhydrous acid.

According to a modified method of working the dilute acid and entraining liquid together with sufficient concentrated acid to form a homogeneous mixture therewith, may be introduced, preferably continuously, at an appropriate point of a suitably heated distillation column. An azeotropic mixture of water and entraining liquid may then be drawn off at the upper part of the column and concentrated acid, subtantially free from entraining liquid, at the lower part. In this manner an independent distillation operation for separation of entraining liquid from concentrated acid may be avoided. Part of the concentrated acid may then be returned, preferably continuously, to the distillation column together with further dilute acid and entraining liquid.

Though in general the dilute acid and entraining body are conveniently introduced into the apparatus in liquid form the invention is not restricted thereto as either or both may be introduced in the form of vapour.

If desired the dilute acid and entraining liquid may be brought together in a body of concentrated acid in a vessel or apparatus separate from that in which removal of water by distillation as an azeotropic mixture is effected. For example a homogenous mixture of fairly concentrated acid and entraining liquid may be prepared in a vessel provided with suitable agitating or mixing means and dilute acid gradually introduced simultaneously with entraining liquid and concentrated acid in such proportions as to maintain substantially constant the composition of the liquid in the vessel. The mixed liquids are continuously withdrawn from the mixing vessel by means of a pump or other device and introduced into a distillation column, for example at a point about one third of the way from the bottom. The column is suitably heated at the lower portion by means of steam coils or otherwise, an azeotropic mixture of water and the entraining liquid escaping from the top into a condenser and concentrated acid accumulating in the lower part. Part of the concentrated acid is transferred in continuous manner to the mixing vessel, while the remaining part, representing that obtained from the dilute acid supplied to the mixing vessel, is discharged as required.

It will be noted that by using a separate mixing vessel the necessity for a second still for separating concentrated acid from entraining liquid may be avoided.

In all cases the distillation columns may be provided with dephlegmators or other devices whereby a portion of the condensate may be returned to the upper ends of the columns in the manner well known in the art of fractional distillation. Again the heat of the vapours escaping from the top of the column and/or the heat of the concentrated acid produced may be utilized in any convenient manner, for example to preheat the dilute acid and/or entraining liquid supplied to the apparatus.

Any desired entraining liquids may be utilized for carrying out the process of the present invention. As examples of entraining liquids especially suitable for use in concentrating acetic acid may be mentioned hydrocarbons, for example benzene or xylene, halogenated hydrocarbons for example trichlorethylene or ethylene dichloride, esters, for example ethyl, propyl, or butyl acetate, or other bodies capable of forming with water azeotropic mixtures of boiling point below that of acetic acid. If desired mixtures of two or more liquids may be employed as entraining liquids, for example a mixture of ethyl acetate with benzene. Preferably, entraining liquids are used which have boiling points below that of the acid to be concentrated in order that separation of the latter from the entraining liquid may be facilitated.

The invention has been described particularly with reference to the concentration of acetic acid. It may, however, be equally well applied to the concentration of other lower aliphatic acids, for example propionic acid or butyric acid.

What I claim and desire to secure by Letters Patent is:—

1. Process for the production of concentrated lower aliphatic acids from their aqueous solutions, which comprises forming a homogeneous mixture containing the aqueous lower aliphatic acid and an entraining agent immiscible with water and distilling the resulting mixture to separate concentrated acid therefrom.

2. Process for the production of concentrated lower aliphatic acids from their aqueous solutions, which comprises mixing the aqueous aliphatic acid with an entraining liquid immiscible with water and sufficient concentrated acid to yield a homogeneous mixture and distilling the resultant mixture to separate concentrated acid therefrom.

3. In the production of concentrated lower aliphatic acids by distillation of their aqueous solutions with entraining liquids, mixing dilute acid and entraining liquid with sufficient concentrated acid to form a homogeneous mixture, distilling the resulting mixture to separate concentrated acid therefrom, and utilizing part of the concentrated acid to mix with further quantities of dilute acid and entraining liquid.

4. A continuous process for the concentration of aqueous solutions of lower aliphatic acids by distillation with entraining liquids, comprising continuously mixing dilute acid with entraining liquid and sufficient concentrated acid to yield a homogeneous mixture, continuously distilling the resulting mixture to separate concentrated acid therefrom and continuously returning part of the concentrated acid to mix with further quantities of dilute acid and entraining liquid.

5. Process for the production of concentrated acetic acid from its aqueous solutions, which comprises forming a homogeneous mixture containing the aqueous acetic acid and an entraining agent immiscible with water and distilling the resulting mixture to separate concentrated acid therefrom.

6. In the production of concentrated acetic acid by distillation of its aqueous solutions with entraining liquids, mixing dilute acid and entraining liquid with sufficient concentrated acid to form a homogeneous mixture, distilling the resulting mixture to separate concentrated acid therefrom, and utilizing part of the concentrated acid to mix with further quantities of dilute acid and entraining liquid.

7. A continuous process for the concentration of aqueous solutions of acetic acid by distillation with entraining liquids, comprising continuously mixing dilute acid with entraining liquid and sufficient concentrated acid to yield a homogeneous mixture, continuously distilling the resulting mixture to separate concentrated acid therefrom and continuously returning part of the concentrated acid to mix with further quantities of dilute acid and entraining liquid.

8. Process for the production of concentrated acetic acid from its aqueous solutions, which comprises mixing the aqueous acetic acid with an entraining liquid immiscible with water and sufficient concentrated acid to yield a homogeneous mixture and distilling the resultant mixture to separate concentrated acid therefrom.

9. Process for the production of concentrated acetic acid from its aqueous solutions, which comprises forming a homogeneous mixture containing the aqueous acetic acid and benzene and distilling the mixture to separate concentrated acid therefrom.

10. Process for the production of concentrated acetic acid from its aqueous solutions, which comprises mixing the aqueous acetic acid with benzene and sufficient concentrated acid to yield a homogeneous mixture and distilling the resultant mixture to separate concentrated acid therefrom.

HENRY DREYFUS.